United States Patent
Yee et al.

(10) Patent No.: US 10,571,691 B1
(45) Date of Patent: Feb. 25, 2020

(54) SERVICE LOOP FOR A HEAD-MOUNTED DISPLAY

(71) Applicant: Facebook Technologies, LLC, Menlo Park, CA (US)

(72) Inventors: Phillip Yee, San Francisco, CA (US); Julian Hammerstein, Woodside, CA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 205 days.

(21) Appl. No.: 15/673,312

(22) Filed: Aug. 9, 2017

(51) Int. Cl.
*G06F 3/01* (2006.01)
*G02B 27/01* (2006.01)
*G06F 1/16* (2006.01)
*H04N 13/344* (2018.01)
*H04M 1/05* (2006.01)
*H04M 1/725* (2006.01)

(52) U.S. Cl.
CPC ......... *G02B 27/017* (2013.01); *G06F 1/1613* (2013.01); *G06F 3/011* (2013.01); *H04N 13/344* (2018.05); *H04M 1/05* (2013.01); *H04M 1/72563* (2013.01)

(58) Field of Classification Search
CPC ..... G06F 3/011; G06F 1/1613; H04N 13/344; H04M 1/05
See application file for complete search history.

(56) References Cited

U.S. PATENT DOCUMENTS

| | | | | |
|---|---|---|---|---|
| 6,181,304 B1 * | 1/2001 | Robinson | ............... | F16M 11/40 345/7 |
| 6,369,952 B1 * | 4/2002 | Rallison | ............... | G02B 27/017 359/630 |
| 2002/0005819 A1 * | 1/2002 | Ronzani | ............... | G02B 27/017 345/8 |
| 2002/0118506 A1 * | 8/2002 | Saito | ....................... | G06F 1/163 361/679.03 |
| 2009/0322972 A1 * | 12/2009 | Ando | ..................... | G02B 7/002 349/11 |
| 2014/0232981 A1 * | 8/2014 | Sugihara | .............. | G02B 27/017 351/158 |
| 2016/0025975 A1 * | 1/2016 | Rabii | ........................ | G06T 1/20 345/173 |
| 2017/0168305 A1 * | 6/2017 | Kusuda | .............. | G02B 27/0172 |

* cited by examiner

*Primary Examiner* — Abbas I Abdulselam
(74) *Attorney, Agent, or Firm* — Morgan, Lewis & Bockius LLP

(57) ABSTRACT

A system includes a head-mounted display, a device including at least one of a computer and a battery, and a strap. The strap includes a first end connected to the head-mounted display, a second end connected to the device, a service loop, and circuitry extending from the first end through the service loop to the second end to electrically couple the head-mounted display with the device.

18 Claims, 4 Drawing Sheets

Virtual-Reality System 100

SERVICE LOOP FOR A HEAD-MOUNTED DISPLAY

TECHNICAL FIELD

This application relates generally to wearable technology and virtual-reality technology, including but not limited to a head-mounted display, a strap, and a service loop for managing the strap and circuitry included in the strap.

BACKGROUND

Virtual-reality head-mounted displays (HMDs) have wide applications in various fields, including engineering design, medical surgery practice, military simulated practice, video gaming, etc. Virtual-reality systems require a high volume of data communication between the HMD and the computer. Historically, cables are used in such systems for conveying the high volume of data. Cables, however, are difficult to manage, especially when included in a headset of the virtual-reality systems (e.g., cable lengths need to be adjustable to accommodate users having different head sizes). Furthermore, as virtual-reality systems become more commonplace, challenges exist for transporting and storing these systems.

SUMMARY

Accordingly, there is a need for a virtual-reality system that (i) manages cables and (ii) facilitates safe and efficient transport and storage of the system. The assemblies and systems disclosed herein address this need.

In accordance with some embodiments, a system includes a head-mounted display, a device including at least one of a computer and a battery, and a strap. The strap includes a first end connected to the head-mounted display, a second end connected to the device, a service loop, and circuitry extending from the first end through the service loop to the second end to electrically couple the head-mounted display with the device.

In accordance with some embodiments, a strap includes a first end to connect to a head-mounted display, a second end to connect to a device including at least one of a computer and a battery, a service loop, and circuitry extending from the first end through the service loop to the second end to electrically couple the head-mounted display with the device.

BRIEF DESCRIPTION OF THE DRAWINGS

For a better understanding of the various described embodiments, reference should be made to the Detailed Description below, in conjunction with the following drawings. Like reference numerals refer to corresponding parts throughout the figures and description.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known systems, methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first end could be termed a second end, and, similarly, a second end could be termed a first end, without departing from the scope of the various described embodiments. The first end and the second end are both ends, but they are not the same end.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
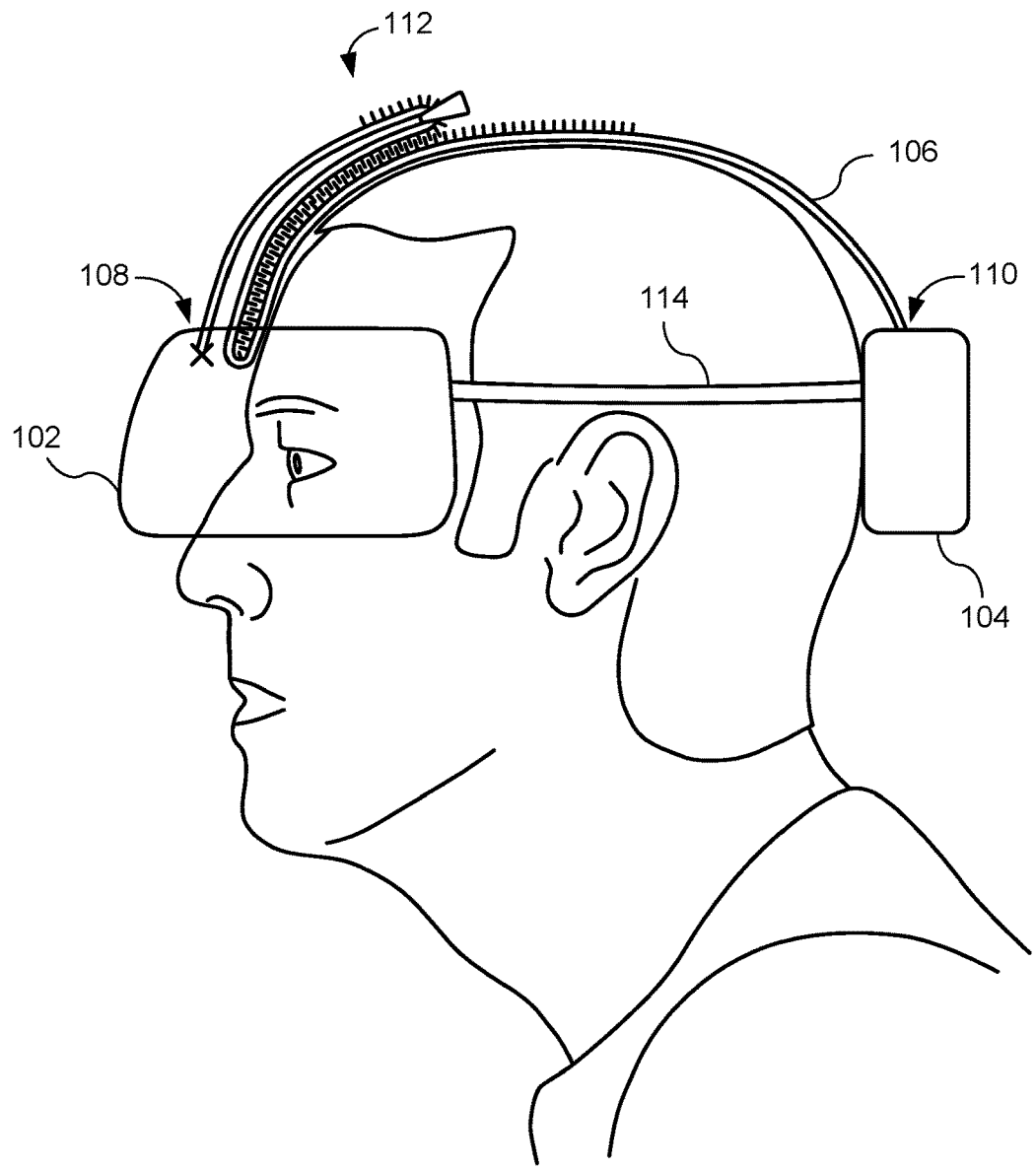
FIG. 1 is a view of a virtual-reality system that includes a device, a head-mounted display (HMD), a strap with first and second ends that connect the head-mounted display with the device, and a service loop, in accordance with some embodiments.

FIG. 1 is a view of a virtual reality (VR) system 100 that includes a head-mounted display (HMD) 102, a device 104, and a strap 106 with a first end 108 connected to the HMD 102 and a second end 110 connected to the device 104. In some embodiments, the first end 108 is a first connector and the second end 110 is a second connector different from the first connector. The first end 108 and second end 110 may be the same type of connector or different types of connectors. The first end 108 and the second end 110 couple the HMD 102 to the device 104 through circuitry (not shown) included in the strap 106 (e.g., the strap 106 surrounds and encases the circuitry). In some embodiments, the device 104 includes a computer and the circuitry includes circuits to convey video data, audio data, etc. from the computer 104 to the HMD 102. Alternatively or in addition, in some embodiments, the device 104 includes a battery and the circuitry includes power bussing to provide power from the battery to the HMD 102.

The strap 106 includes (e.g., is partially formed into) a service loop 112. The service loop 112 is used (e.g., by a user of the VR system 100) to manage the strap 106 and the circuitry included therein. In doing so, mechanical interference with the user experience caused by the strap 106 is reduced, which results in a superior experience for the user of the VR system 100. Furthermore, in some embodiments, the strap 106, and in turn the service loop 112, are covered at least in part by a cover or housing. Such a configuration further reduces mechanical interference caused by the strap 106. At least a portion of the strap 106 and/or the service loop 112 may remain exposed to allow for adjustment of the service loop 112 (e.g., a tab 310 remains exposed, FIG. 3). In some embodiments, the device 104 is covered at least in part by a cover or housing. In this way, the strap 106 and/or the device 104 are concealed and protected.

In some embodiments, the circuitry includes a flexible circuit (i.e., flexible circuitry) extending from the first end 108 through the service loop 112 to the second end 110. Alternatively, in some embodiments, the circuitry includes a ribbon cable extending from the first end 108 through the service loop to the second end 110.

In some embodiments, the strap 106 includes a jacket (e.g., a casing) and the circuitry is housed inside the jacket. The jacket may be made from any suitable material known by those skilled in the art. For example, the jacket may be made from a flexible polymer (e.g., rubber) allowing for formation of the service loop 112.

In some embodiments, the VR system 100 further (or alternately) includes one or more side straps 114 to secure the VR system 100 to the head of the user. In some embodiments, the one or more side straps 114 include circuitry (not shown) similar to the circuitry included in the strap 106. In some embodiments, the one or more side straps 114 each include a first end connected to the HMD 102 and a second end connected to the device 104. In those embodiments where the device 104 is a computer, the circuitry in each of the one or more side straps 114 includes circuits to convey video data, audio data, etc. from the computer 104 to the HMD 102. In those embodiments where the device 104 is a battery, the circuitry in each of the one or more side straps 114 includes power bussing to provide power to the HMD 102. In those embodiments where the device 104 is a computer and a battery, the circuitry in each of the one or more side straps 114 includes power bussing to provide power to the HMD 102 and circuits to convey video data, audio data, etc. from the computer 104 to the HMD 102. Furthermore, in some embodiments, each of the one or more side straps 114 includes a service loop (e.g., service loop 400, FIG. 4A; service loop 420, FIG. 4B).

Figure 2:
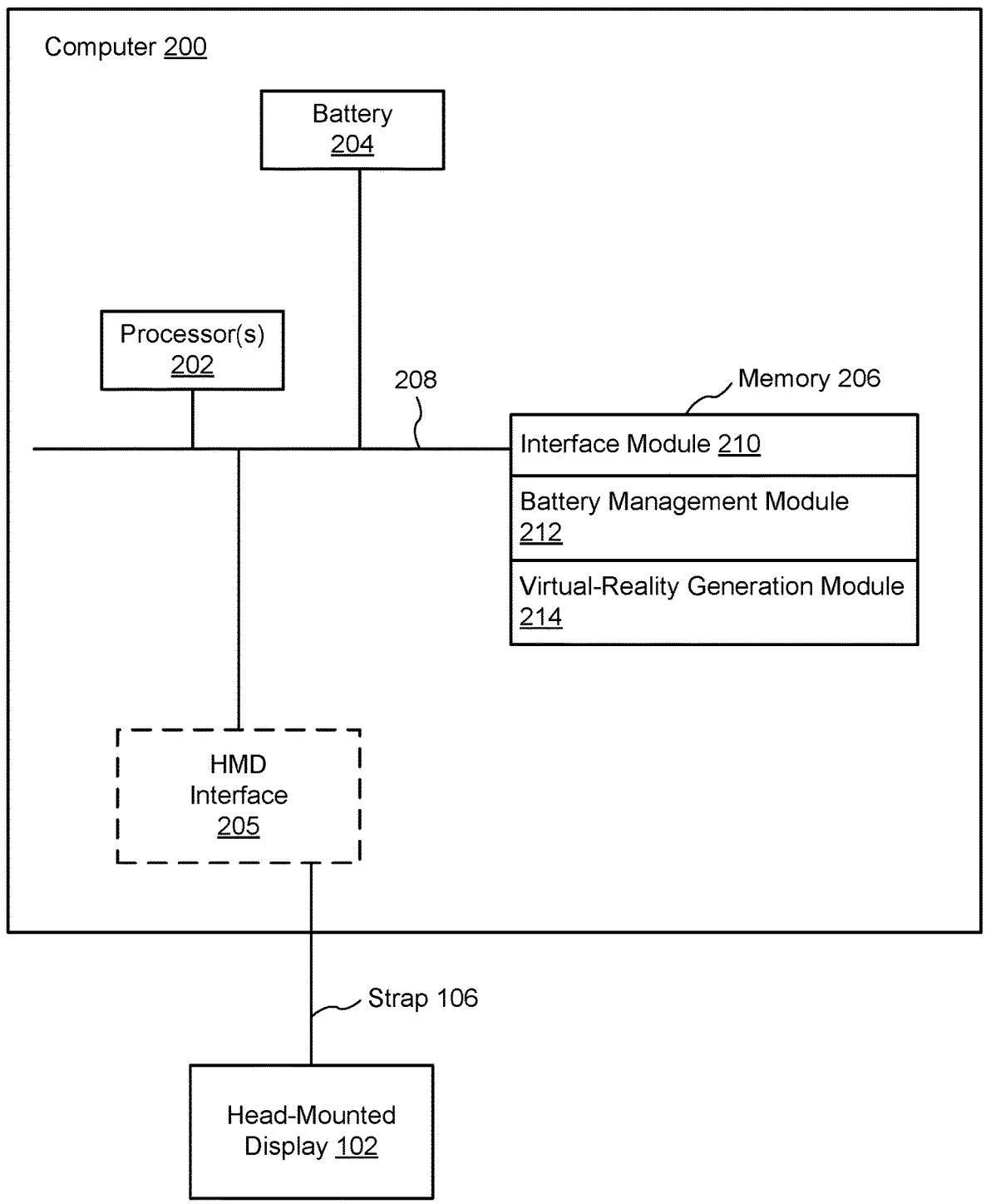
FIG. 2 is a block diagram illustrating a computer coupled to an HMD in accordance with some embodiments.

FIG. 2 is a block diagram illustrating a computer 200 in accordance with some embodiments. In some embodiments, the computer 200 is an example of the device 104 (FIG. 1) or a portion thereof. In some embodiments, the computer 200 is a mobile device (e.g., a portable gaming device, a mobile phone, etc.). In some embodiments, the VR system 100 includes a docking station (or some other connector) for connecting the VR system 100 (e.g., the HMD 102) with the mobile device. For example, the device 104 includes a dock to receive the computer 200. The docking station may connect the computer 200 to the HMD 102 via the strap 106.

The computer 200 includes one or more processing units (processors or cores) 202, a battery 204, memory 206, and one or more communication buses 208 for interconnecting these components. The communication buses 208 optionally include circuitry (sometimes called a chipset) that interconnects and controls communications between system components. The computer 200 optionally includes an HMD interface 205. The HMD interface 205, if provided, acts as an interface between the HMD 102 and the computer 200 (e.g., conveys video data, audio data, etc. between the HMD 102 and the computer 200 via the communication buses 208 and the circuitry included in the strap 106).

Memory 206 includes high-speed random access memory, such as DRAM, SRAM, DDR RAM, or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the processor(s) 202. Memory 206, or alternately the non-volatile memory device(s) within memory 206, includes a non-transitory computer-readable storage medium. In some embodiments, memory 206 or the computer-readable storage medium of memory 206 stores the following programs, modules, and data structures, or a subset or superset thereof:

- an interface module 210 that is used for communicating with the HMD 102 (via the strap 106 and the circuitry included therein), and other components of the computer 104;
- a battery management module 212 that is used for managing and providing power (e.g., direct current) to the HMD 102; and
- a virtual-reality generation module 214 that is used for generating virtual-reality images and sending corresponding video and audio data to the HMD 102.

Each of the above identified elements may be stored in one or more of the previously mentioned memory devices that together form the memory 206, and corresponds to a set of instructions for performing a function described above. The above identified modules or programs (i.e., sets of instructions) need not be implemented as separate software programs, procedures or modules, and thus various subsets of these modules may be combined or otherwise re-arranged in various implementations. In some embodiments, the memory 206 may store a subset of the modules and data structures identified above. Furthermore, the memory 206 may store additional modules and data structures not described above.

Figure 3:
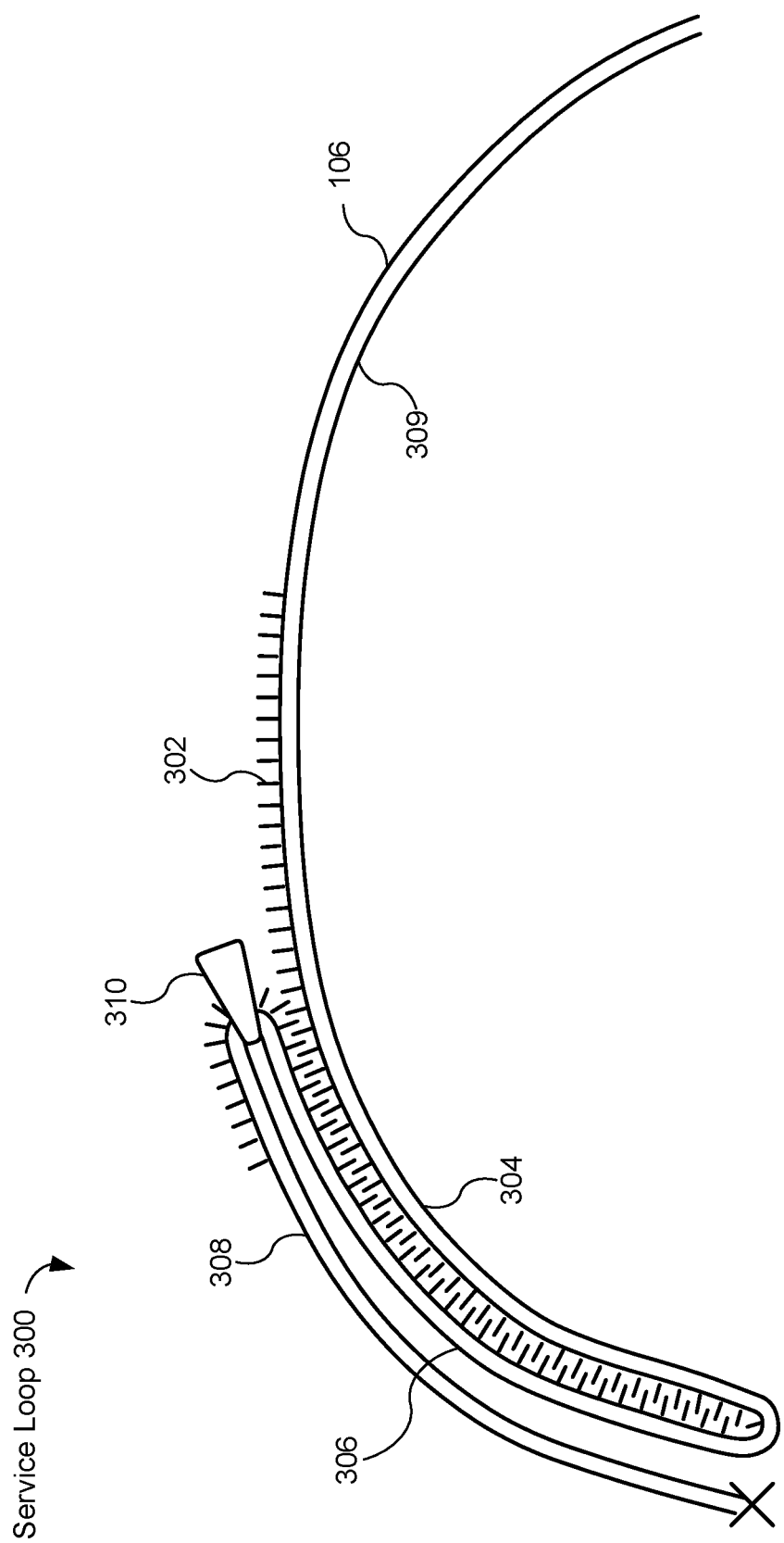
FIG. 3 is a side view of a strap that includes a service loop in accordance with some embodiments.

FIG. 3 is a side view of a strap that includes a service loop 300 in accordance with some embodiments. One or more features shown in FIG. 1 have been removed for clarity of illustration.

In some embodiments, the service loop 300 is an example of the service loop 112 (FIG. 1). The service loop 300 is formed out of the strap 106 (e.g., the service loop 300 includes portions of the strap 106). The service loop 300 is formed because the strap 106 has an overall length that is substantially longer than an average head size of users of the VR system 100, in order to accommodate above-average head sizes. Because of this, when the VR system 100 is worn by the average user, a certain length of the strap 106 does not fit around the user head. The service loop 300 is formed to manage the length of the strap 106 that does not fit around the user head.

In some embodiments, to form the service loop 300, the strap 106 includes connectors 302 disposed on a surface of the strap 106. For example, the connectors 302 include hook-and-loop material or include interlocking teeth. The interlocking teeth may be made from any suitable material known by those skilled in the art (e.g., metal, plastic, etc.). In some embodiments, the connectors 302 are disposed along the entire length of a first surface of the strap 106. Alternatively, in some embodiments, the connectors 302 are disposed along a portion of the first surface of the strap 106 (e.g., disposed along a predefined length of the strap 106). As shown, a second surface of the strap 106, opposite the first surface, does not include the connectors 302. However, in some embodiments, additional connectors are disposed on at least a portion of the second surface of the strap 106 (discussed in more detail below).

The service loop 300 includes first 304, second 306, and third 308 overlapping portions of the strap 106. In addition, the strap 106 includes a fourth portion 309 not included in the service loop 300, and may have a fifth portion that is also not included in the service loop 300 and is on the opposite side of the service loop 300 from the fourth portion. In some embodiments, the fourth portion 309, or at least part of the fourth portion 309, does not include the connectors 302. The first portion 304 is detachably connected to the second portion 306 via the connectors 302. For example, the first portion 304 is disposed along the second portion 306 such that a first surface of the first portion 304 is coupled with a first surface of the second portion 306 via the connectors 302. The first surfaces of the first and second portions are part of the first surface of the strap 106. In some embodiments, the third portion 308 is not connected to the second portion 306 via the connectors 302. Instead, the third portion 308 is disposed along the second portion 306 such that a second surface of the third portion 308 is substantially adjacent to a second surface of the second portion 306. The second surfaces of the second and third portions are part of the second surface of the strap 106.

In some embodiments, the third portion 308 is connected to the second portion 306 via additional connectors (e.g., hook-and-loop material or interlocking teeth). For example, the second surface of the third portion 308 and the second surface of the second portion 306 include the additional connectors (as noted above) and the second portion 306 is connected to the third portion 308 via the additional connectors.

In some embodiments, the strap 106 further includes a tab 310, situated between the second 306 and third 308 portions. The tab 310 is used to adjust the first 304, second 306, and third 308 portions. For example, a user may adjust lengths of the first 304, second 306, and third 308 portions by separating the first portion 304 from the second portion 306 using the tab 310 (e.g., lifting the second portion 306 away from the first portion 304). After separating the first 304 and second 306 portions, the user may increase (or decrease) a size of the service loop 300 by increasing (or decreasing) an amount of the first portion 304 that is disposed along the second portion 306 (e.g., by pulling the tab 310 in an appropriate direction). In some embodiments where the connectors 302 are interlocking teeth, the user may adjust lengths of the first 304, second 306, and third 308 portions by simply pushing or pulling the tab 310 (i.e., the user does not have to separate the first portion 304 from the second portion 306 to increase or decrease the size of the service loop 300). For example, the user may increase the size of the service loop 300 by pulling the tab 310 to the right or may decrease the size of the service loop 300 by pushing the tab 310 to the left. Adjusting the size of the service loop 300 may be performed when the head size of a user is different from the head size of a previous user.

Figure 4A:
FIGS. 4A-4B are side views of straps that include different service loops in accordance with some embodiments.
Figure 4A:
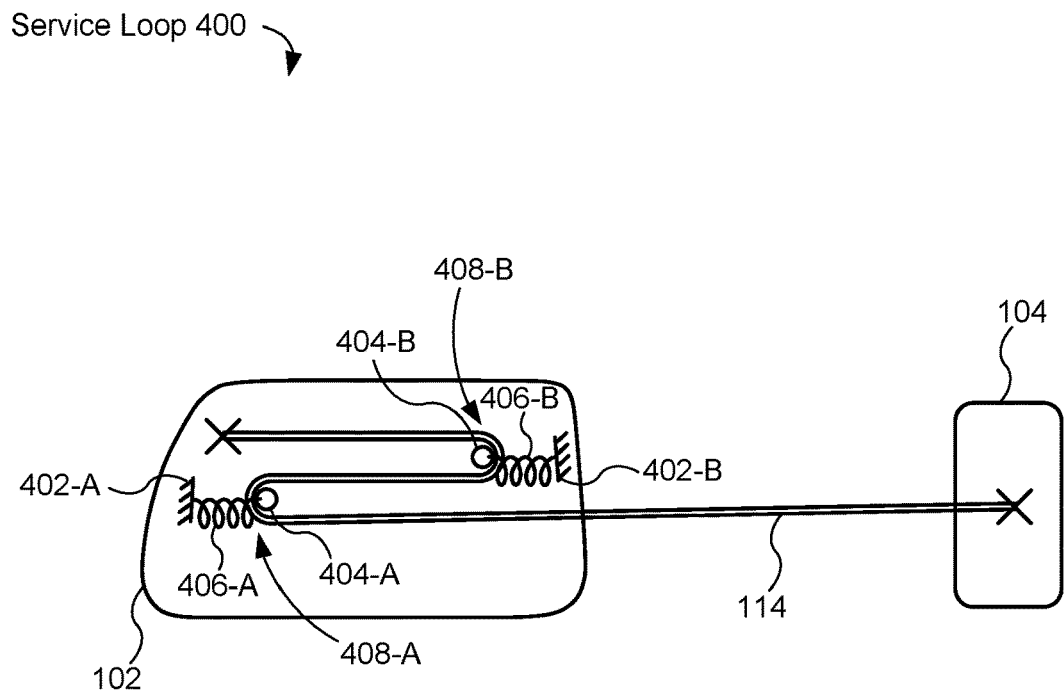

FIG. 4A is a side view of a different embodiment of a service loop 400, in accordance with some embodiments. One or more features shown in FIG. 1 have been removed for clarity of illustration.

As shown, the strap 114 is connected at a first end to the HMD 102 and connected at a second end to the device 104. In this example, a length of the service loop 400 dynamically adjusts according to received forces. For example, when the VR system 100 is being worn by a user (e.g., is in a first state), the service loop 400 has a first length. However, when the VR system 100 is being removed from the user's head (e.g., is in a second state), the service loop 400 dynamically adjusts from the first length to a second length, which is different from the first length. In addition, after removing the VR system 100 (e.g., the VR system 100 is in a third state), the service loop 400 dynamically adjusts from the second length to a third length, which is different from the first and second lengths (or is the same as the first length but different from the second length). For example, when in the third state, the HMD 102 is pulled towards the device 104 by the service loop 400, reducing an overall footprint of the VR system 100.

In some embodiments, the service loop 400 is included in a side strap 114 (e.g., the strap 114 fits around a side of a user's head, FIG. 1). In some embodiments, the HMD 102 includes first and second anchors 402-A, 402-B. In some embodiments, the first and second anchors 402-A, 402-B are integrally formed with a portion of the HMD 102 (e.g., a side portion of the HMD 102). In some embodiments, the HMD 102 and the anchors 402-A, 402-B are formed from the same piece of material. Alternatively, in some embodiments, the first and second anchors 402-A, 402-B are coupled to the portion of the HMD 102. For example, the first and second anchors 402-A, 402-B may be mechanically and/or chemically (e.g., using an adhesive) fastened to the HMD 102.

Furthermore, first and second posts 404-A, 404-B are coupled to the first and second anchors 402-A, 402-B via first and second springs 406-A, 406-B, respectively. In some embodiments, the first and second anchors 402-A, 402-B, the first and second posts 404-A, 404-B, and the first and second springs 406-A, 406-B are covered by a housing to increase a durability of the VR system 100 (e.g., reduce likelihood of catching/snagging one of the features during transportation and/or storage of the VR system 100).

As shown, the service loop 400 includes: (i) a first curve 408-A wound partially around the first post 404-A, and (ii) a second curve 408-B wound partially around the second post 404-B. The first and second posts 404-A, 404-B are located in respective first positions (e.g., located in the respective first positions when the user is wearing (e.g., the first state) the VR system 100). Accordingly, when the strap 114 is subject to a tension force (e.g., when the user removes the virtual reality system 100 from his or her head (i.e., transitioning to the second state)), the springs 406-A, 406-B stretch allowing the first and second posts 404-A, 404-B to translate from their respective first positions to respective second positions (e.g., the first post 404-A translates right and the second post 404-B translates left). In doing so, an amount of the strap 114 in the service loop 400 decreases. In this way, the user may remove the VR system 100 from his or her head without damaging connections between the HMD 102 and the device 104. During the transmission from the first state to the second state, the strap 114 remains taut due to forces applied to the strap 114 by the springs 406-A, 406-B.

After the user removes the VR system 100 from his or her head (i.e., transitioning from the second state to the third state), the springs 406-A, 406-B contract, allowing the first and second posts 404-A, 404-B to translate from their respective second positions to the respective first positions (e.g., the strap 114 is pulled taut), or some position in which the first and second posts 404-A, 404-B are contracted past the respective first positions (e.g., the first post 404-A translates left and the second post 404-B translates right). In doing so, an amount of the strap 114 in the service loop 400 increases. By increasing the amount of the strap 114 in the service loop 400, the HMD 102 is pulled towards the device 104, reducing an overall footprint of the VR system 100 and protecting the HMD 102 from damage.

In some embodiments, the HMD 102 includes first and second slots (not shown) to receive the first and second posts 404-A, 404-B, respectively. For example, the slots are defined horizontally (or diagonally) so that the posts 404-A, 404-B translate horizontally (or diagonally) when transitioning between the first, second, and third states. For example, the first slot may have a width approximately equal to a width of a first portion (e.g., a lower half) of the first post 404-A. Furthermore, a second portion (e.g., an upper portion) of the first post 404-A may have a width greater than the width of the first slot. The second post 404-B may be designed in a similar fashion. In this way, the first post 404-A sits in the first slot and the second post 404-B sits in the second slot. As such, the first and second posts 404-A, 404-B slide within their respective slots according to the tension forces received (e.g., translate accordingly when the VR system 100 transitions between the first, second, and third states). The first and second posts 404-A, 404-B may have other designs to facilitate sliding of the first and second posts 404-A, 404-B within their respective slots (e.g., each post may break apart and be reassembled such that a middle portion of each post is disposed in the respective slot).

Figure 4B:
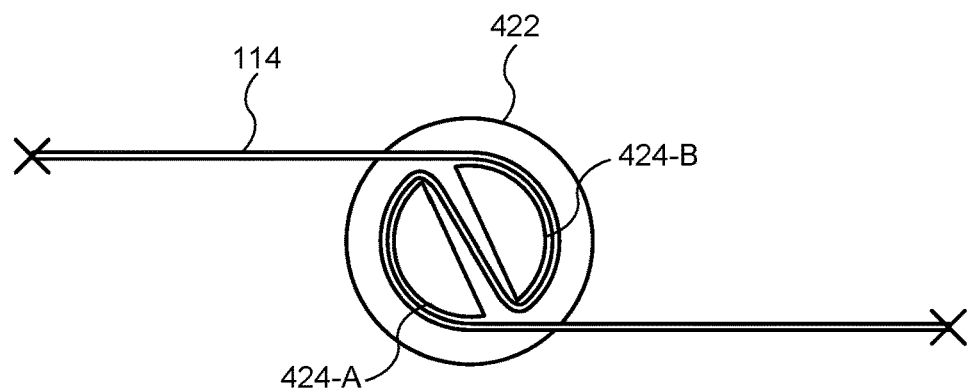

FIG. 4B is a side view of a different embodiment of a service loop 420, in accordance with some embodiments. The HMD 102 and device 104 have been removed for clarity of illustration. The strap 114 is connected at a first end to the HMD 102 (not shown) and at a second end to the device 104 (not shown).

In this example, a length of the service loop 420 dynamically adjusts according to received forces, similar to the service loop 400 discussed above. However, in this case, a strap 114 includes a rotatable spool 422 having a first raised portion 424-A and a second raised portion 424-B separated from the first raised portion 424-A by a distance (e.g., a channel is defined between the first raised portion 424-A and the second raised portion 424-B). To form the service loop 420, the strap 114 is wound around and between the first and second raised portions 424-A, 424-B of the rotatable spool 422. As shown, the service loop 420 is wound around the first raised portion 424-A in a first direction (e.g., a clockwise direction), disposed in the channel between the first raised portion 424-A and the second raised portion 424-B, and wound around the second raised portion 424-B in a second direction (e.g., a counterclockwise direction) opposite to the first direction. Accordingly, when the strap 114 is subject to a tension force (e.g., when the user removes the virtual reality system 100 from his or her head, transitioning from the first state to the second state), the rotatable spool 422 rotates (e.g., rotates counterclockwise). In doing so, an amount of the strap 114 in the service loop 420 decreases. In this way, the user removes the VR system 100 from his or her head without damaging connections between the HMD 102 and the device 104.

In some embodiments, the rotatable spool 422 is coupled to a gear (not shown) that positions the rotatable spool 422 in a first orientation using a torsional force when the VR system 100 is being worn by the user (e.g., in the first state). Furthermore, the gear positions the rotatable spool 422 in the first orientation (or a third orientation) using the torsional force when the VR system 100 is not being worn by the user (e.g., in the third state). The rotatable spool 422 in FIG. 4B is shown in the first orientation and the torsional force is a torsional clockwise force. Accordingly, when the user removes the virtual reality system 100 from his or her head, i.e., transitioning from the first state to the second state, the rotatable spool 422 is subjected to a torsional counterclockwise force greater than torsional clockwise force applied by the gear, which results in the rotatable spool 422 rotating counterclockwise to a second orientation. The rotation from the first orientation to the second orientation decreases an amount of the strap 114 in the service loop 420.

Furthermore, after the user removes the VR system 100 from his or her head (i.e., transitioning from the second state to the third state), the rotatable spool 422 is no longer subjected to the torsional counterclockwise force, and therefore, the gear rotates the rotatable spool 422 from the second orientation to the first orientation (or the third orientation). The rotation from the second orientation to the first orientation increases an amount of the strap 114 in the service loop 420. By increasing the amount of the strap 114 in the service loop 420, the HMD 102 is pulled towards the rotatable spool 422 and the device 104. In some embodiments, when transitioning from the second state to the third state, the gear rotates the rotatable spool 422 from the second orientation past the first orientation to the third orientation.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A system, comprising: a head-mounted display; a device comprising at least one of a computer and a battery; and a strap, comprising: a first end connected to the head-mounted display; a second end connected to the device; a service loop; and circuitry extending from the first end through the service loop to the second end to directly connect electrically the head-mounted display with the device, wherein the circuitry comprises a flexible circuit extending from the first end through the service loop to the second end.

2. The system of claim 1, wherein the circuitry comprises a ribbon cable extending from the first end through the service loop to the second end.

3. The system of claim 1, wherein the strap further comprises connectors disposed on a surface of the strap.

4. The system of claim 3, wherein:
the service loop comprises first, second, and third overlapping portions of the strap; and
the first portion is connected to the second portion via the connectors.

5. The system of claim 4, wherein:
the strap further comprises a tab, situated between the second and third portions, to adjust the first, second, and third portions.

6. The system of claim 3, wherein the connectors comprise hook-and-loop material.

7. The system of claim 3, wherein the connectors comprise interlocking teeth.

8. The system of claim 1, wherein:
the head-mounted display comprises first and second anchors;
the system further comprises:
first and second posts; and
first and second springs coupling the first and second anchors to the first and second posts, respectively; and the service loop comprises:
 a first curve wound partially around the first post, and
 a second curve wound partially around the second post.

9. The system of claim 1, wherein:
the strap further comprises a rotatable spool, the rotatable spool comprising:
 a first raised portion; and
 a second raised portion separated from the first raised portion by a distance; and
the service loop is wound around and between the first and second raised portions of the rotatable spool.

10. The system of claim 9, wherein the service loop is wound around the first raised portion in a first direction and is wound around the second raised portion in a second direction opposite to the first direction.

11. The system of claim 1, wherein:
the strap further comprises a jacket; and
the circuitry is housed inside the jacket.

12. The system of claim 1, wherein the strap fits over the top of a user's head.

13. The system of claim 1, wherein the strap fits around a side of a user's head.

14. The system of claim 1, wherein:
the device comprises a computer; and
the circuitry comprises circuits to convey video data from the computer to the head-mounted display.

15. The system of claim 1, wherein:
the device comprises a battery; and
the circuitry comprises power bussing to provide power to the head-mounted display.

16. A strap, comprising: a first end to connect to a head-mounted display; a second end to connect to a device comprising at least one of a computer and a battery; a service loop; and circuitry extending from the first end through the service loop to the second end to directly connect electrically the head-mounted display with the device, wherein the circuitry comprises a flexible circuit extending from the first end through the service loop to the second end.

17. The strap of claim 16, wherein the circuitry comprises a ribbon cable extending from the first end through the service loop to the second end.

18. The strap of claim 16, wherein the strap further comprises connectors disposed on a surface of the strap.

* * * * *